US006010590A

United States Patent [19]

Cherkas

[11] Patent Number: 6,010,590

[45] Date of Patent: Jan. 4, 2000

[54] SURFACE COATING ON A SUBSTRATE FOR PRINTING A HIGH QUALITY IMAGE THEREON AND METHOD OF PROVIDING SAME

[76] Inventor: Ronald Cherkas, 106 SW. 2nd St., Des Moines, Iowa 50309

[21] Appl. No.: 08/947,547

[22] Filed: Oct. 11, 1997

Related U.S. Application Data

[63] Continuation-in-part of application No. 08/884,274, Jun. 27, 1997.

[51] Int. Cl.[7] .............................. B32B 31/00; B32B 33/00

[52] U.S. Cl. .......................... 156/277; 156/90; 156/307.7; 347/105; 427/314; 427/316; 427/322; 427/326; 427/402; 427/428; 428/195; 428/219; 524/803

[58] Field of Search ............................ 524/803; 347/105; 156/90, 277, 307.7; 428/195, 219; 427/314, 316, 322, 326, 402, 428

[56] References Cited

U.S. PATENT DOCUMENTS

| | | | |
|---|---|---|---|
| 5,139,903 | 8/1992 | Malhotra | 347/105 |
| 5,270,103 | 12/1993 | Oliver et al. | 347/105 |

*Primary Examiner*—Deborah Jones
*Assistant Examiner*—Robert R. Koehler
*Attorney, Agent, or Firm*—Kent A. Herink, Esq.; Daniel A. Rosenberg; Davis Brown Law Firm

[57] ABSTRACT

A surface coating applied on a substrate as well as a method of preparing a surface coated substrate are provided. A mixture comprising about 40% polyvinyl acetate and about 60% polyvinyl alcohol is applied to a porous substrate. Then, the mixture is heated. The polyvinyl alcohol cures by evaporation, and the mixture separates into a hydrophilic layer of polyvinyl alcohol and a hydrophobic layer of polyvinyl acetate, and the hydrophilic layer is between the hydrophobic layer and the substrate. A water-soluble ink is then deposited into the surface coating, and the ink is generally repelled by the hydrophobic layer, and is generally absorbed by the hydrophilic layer. Additionally, the hydrophobic layer protects from fading the ink which is absorbed into the hydrophilic layer, causes the ink to spread less in the hydrophilic layer, allows a charge to be applied to the same side of the substrate on which the ink is deposited, and allows an enhanced surface charge to be applied. Preferably, the surface coating can maintain a surface charge density of between about 10,000 volts and about 14,000 volts. If more than one color of ink is deposited into the surface coating, the hydrophobic layer causes a second color ink to be repelled less from a first color of ink in the surface coating. The surface coating can be coated with a water-based coating substance.

38 Claims, 3 Drawing Sheets

SURFACE COATING ON A SUBSTRATE FOR PRINTING A HIGH QUALITY IMAGE THEREON AND METHOD OF PROVIDING SAME

RELATED APPLICATION

This is a continuation-in-part of U.S. patent application Ser. No. 08/884,274, filed Jun. 27, 1997, entitled Method for Preparing Improved Back-Lighted Images.

BACKGROUND OF THE INVENTION

The present invention relates generally to a surface coating on a substrate on which an image is to be printed and, more specifically, to a surface coating on a substrate where the surface coating comprises a hydrophobic layer and a hydrophilic layer, wherein the hydrophilic layer is between the hydrophobic layer and the substrate.

Printed images are in common use in a variety of applications. For example, back-lighted images are often used as commercial signs, slot machine graphics, and exhibit displays. In this case, the image, typically in color, is produced on a light-transmissive substrate such as glass, Lexan®, and the like. The substrate and image combination is placed in an opening of an enclosure and back-lighted by any one of a variety of light sources.

The known technique for creating the image on the light transmissive substrate is through the use of silk screening. The resulting silk screened image is comprised of a dot matrix of the inks or dyes used to create the image. The granularity of silk screened images is, however, relatively high so that it is difficult to get continuous tone, photo-realistic high color saturation and opacity with back-lighted silk screen images.

The silk screening technique also suffers from a cost disadvantage in low volume production situations. The relatively high cost of preparing the silk screens used to make the image makes using the silk screening technique impractical if only a small number of copies of the silk screen image are to be produced.

Another known technique is to use a color image produced on a light-transmissive photofilm. However, such photofilms also do not have a high opacity (3.0 density black) and color saturation when used in a back-lighted display. Moreover, the gelatin emulsion used in photofilms is subject to degradation at extended temperatures above 150 degrees Fahrenheit.

Such high temperatures are commonly experienced in back-lighted displays where heat which may not be adequately dissipated is created by the light sources of the bright light required for an effective display and from mechanical components as are used in, for example, gaming machines.

More recently, ink jet printing of colored inks onto light-transmissive media for displaying color images has become known. Such images have been widely used for overhead projection applications. While the overhead images thus produced are relatively inexpensive and are acceptable for many uses, the color saturation and opacity have been a problem. When aqueous inks are used, moreover, special coatings must be provided on the light-transmissive medium to absorb the dyes so that images of an acceptably high quality are formed. For example, U.S. Pat. No. 4,783,376 teaches coating a light-transmissive material with a polyvinyl alcohol solution before ink jet printing thereon. While the polyvinyl alcohol coating works to absorb the ink resulting in a fairly high quality image being printed, the polyvinyl alcohol coating causes individual colors of a multi-color image to bleed into each other. This bleeding results from the fact that polyvinyl alcohol is highly water soluble and tends to attract the ink in a transverse direction after the ink is applied to the coating. Yet another disadvantage of the polyvinyl alcohol coating is that the coating fails to adequately protect the dried ink from fading due to exposure to UV light.

Furthermore, to protect an image from water and UV light, it is often desirable to protect the image by overcoating same with some sort of water-repellent material. When a polyvinyl alcohol surface coating is utilized, a mineral or spirits based overcoating material must be selected. Unfortunately, this type of overcoating material presents certain environmental problems, and as a result, often presents problems with OSHA.

Finally, when printing on a medium using an ink jet method, a surface charge is typically applied to the medium. As a result, the ink jet travels in a more direct line to the medium, and a sharper image is printed. Additionally, because the surface charge causes the ink jet to be attracted to the medium, it is possible to print faster. Consequently, it is generally desirable to try to maximize the surface charge on the medium to which the image is to be printed using an ink jet. However, when a polyvinyl alcohol surface coating is utilized, the level of the surface charge must be fairly moderate else the image degrades. Another use of coated paper for ink jet printing is the application of ink to high quality fine art papers and fine art canvas for limited edition or "1-off", on demand printing of computer files. The coating layer holds the colors and offers intensities only formerly achieved through offset printing. In offset printing, multiple striking of the ink head, or various dot gain formulas are used as each paper used prints with different results. By using a coated paper of the present invention, the same ink setting can be used on all papers with the same coating, thus making the printing process more profitable, resulting in fewer setups and less testing. This particularly applies to on-demand press-direct digital offset printing.

The difficulties discussed hereinabove are substantially eliminated by the present invention.

SUMMARY OF THE INVENTION

Accordingly, an object of the present invention is to provide a surface coating on a substrate so that an image having a high degree of opacity and color saturation can be printed thereon for both front-lighted and back-lighted applications.

Another object of the present invention is to provide a surface coating on a substrate where the surface coating works to protect an image from fading as result of, for example, exposure to UV light.

Still another object of the present invention is provide a surface coating on a substrate where the surface coating minimizes the bleeding of ink applied to the surface coating.

Yet another object of the present invention is to provide a surface coating on a substrate where the surface coating allows an enhanced surface charge to be applied to the substrate so that an extremely sharp ink jet image can be quickly printed thereon.

Still yet another object of the present invention is to provide a surface coating on a substrate where, after an image is printed thereon, a water-based overcoat may be applied.

Yet still a further object of the present invention is to provide a method of providing a surface coated substrate so that an extremely high quality, saturated image can be printed thereon.

The foregoing and other objects, features, and advantages of the present invention will be more readily apparent from a review of the following detailed description and claims.

By the present invention, it is proposed to overcome the difficulties encountered heretofore. To this end, a surface coating applied on a first side of a substrate is provided where the surface coating comprises a hydrophobic layer and a hydrophilic layer where the hydrophilic layer is between the hydrophobic layer and the first side of the substrate. By providing a hydrophilic layer between the hydrophobic layer and the substrate, an image can be printed onto the surface coating where the image is sharper as a result of less bleeding of the individual colors of the image. Additionally, the hydrophobic layer works to protect the image from UV light. Furthermore, the hydrophobic layer allows a water-based overcoat, as opposed to a mineral or spirits based overcoat, to be applied to the image. Moreover, the hydrophobic layer allows the surface coating to maintain an enhanced surface charge density.

In a preferred embodiment of the present invention, a surface coating applied on a first side of a porous substrate is provided, and the surface coating comprises a mixture comprising about 60% polyvinyl alcohol and about 40% polyvinyl acetate. After the mixture has been applied, preferably the mixture has been heated for between about fifteen and about twenty minutes with moving air at a temperature between about 60 and about 80 degrees Fahrenheit, and then has been heated for between three minutes and about eight minutes with moving air at a temperature of between about 100 and about 140 degrees Fahrenheit. As the mixture dries, the polyvinyl acetate migrates to the top, the polyvinyl alcohol cures by evaporation, and there results on the porous substrate a top, hydrophobic layer of polyvinyl acetate, and a bottom, hydrophilic layer of polyvinyl alcohol. Preferably, a water soluble ink deposited into the surface coating is generally impelled through the hydrophobic layer of polyvinyl acetate, and is generally absorbed by the hydrophilic layer of polyvinyl alcohol. The polyvinyl alcohol thin layer keeps the ink from totally absorbing into the paper. Additionally, the hydrophobic layer of polyvinyl acetate protects from fading the ink which is absorbed into the hydrophilic layer of polyvinyl alcohol, causes the ink to spread less in the hydrophilic layer, and allows a charge to be applied to the same side of the substrate on which the ink has been deposited. Preferably, the surface coating can maintain an enhanced surface charge density at a voltage of between about 10,000 volts and about 14,000 volts. If more than one color of ink is deposited into the surface coating, the hydrophobic layer of polyvinyl acetate causes a second color ink to be repelled less from a first color of ink in the surface coating. The surface coating is coatable with a water-based coating substance.

Also provided is a method of preparing a surface coated substrate for printing an image thereon, and the method comprises providing a mixture comprising at least 15% polyvinyl acetate and at most 85% polyvinyl alcohol, providing a substrate having a surface, and coating the surface of the substrate with the mixture.

Within a preferred method of the present invention, a coating solution is formulated comprising about 40% polyvinyl acetate and about 60% polyvinyl alcohol heated with little or no mixing in a pressure chamber, wherein the steam allows a total mixing of the solution and prevents the solution from becoming too concentrated and thus requiring the admixture of evaporated solvents. The coating mixture is cooled to a temperature suitable for application by a roller coater. If the mixture is to be stored for any substantial period before application, it should be stored in a sealed container with a limited amount of air space, such as in a carboy, to prevent excessive drying of the mixture. A method of preparing a surface coated substrate for printing an image thereon is provided, and the method comprises providing a porous substrate having a surface, and coating the surface of the substrate with the mixture. Then, the porous substrate coated with the mixture is heated for between about fifteen and about twenty-five minutes with moving air at a temperature of between about 60 and about 80 degrees Fahrenheit, and then the mixture is heated for between about three and about eight minutes with moving air at a temperature of between about 100 and about 140 degrees Fahrenheit. The polyvinyl alcohol cures by evaporation, and the mixture tends to separate into a bottom, hydrophilic layer of polyvinyl alcohol and an upper, hydrophobic layer of a relatively higher concentration of polyvinyl acetate. A water-soluble ink is then deposited into the surface coating, and the ink is generally repelled by the hydrophobic layer of polyvinyl acetate, and is generally absorbed by the hydrophilic layer of polyvinyl alcohol. The coating, by accepting the ink, controls over-spraying and "misting." Additionally, the hydrophobic layer of polyvinyl acetate protects from fading the ink which is absorbed into the hydrophilic layer of polyvinyl alcohol, causes the ink to spread less in the hydrophilic layer, allows a charge to be applied to the same side of the substrate on which the ink is deposited, and allows an enhanced surface charge to be applied. Preferably, the surface coating can maintain a surface charge density at a voltage of between about 10,000 volts and about 14,000 volts. If more than one color of ink is deposited into the surface coating, the hydrophobic layer of polyvinyl acetate causes a second color ink to be repelled less from a first color of ink in the surface coating. The surface coating can be coated with a water-based coating substance.

Other features and advantages of the present invention will become apparent from a review of the following description, drawings, and claims.

DETAILED DESCRIPTION OF THE INVENTION

Figure 1:
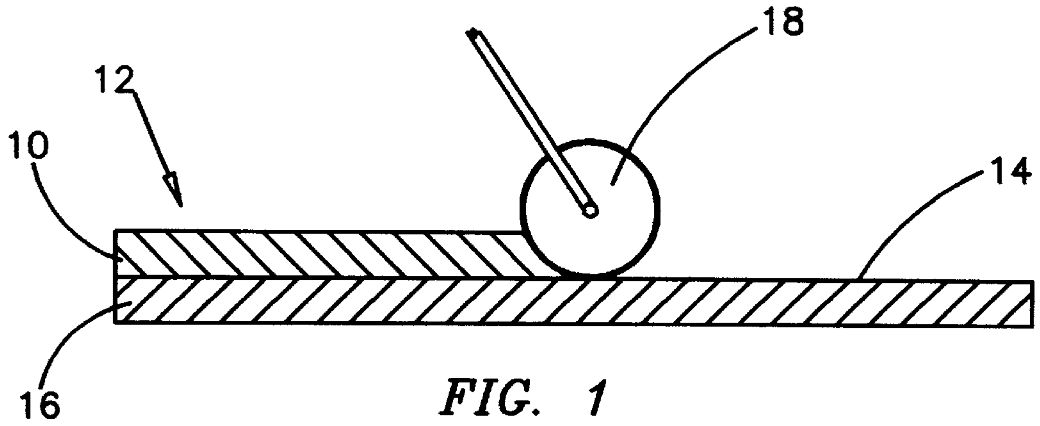
FIG. 1 is a side view of a substrate having a first side showing a surface coating being applied on the first side of the substrate in accordance with the present invention.

Substrates having images printed thereon are used in a wide variety of applications. For example, a substrate having an image thereon where the image is displayed and lit from behind has many applications. Examples of situations where back-lighted displays are used include: free-standing outdoor display advertising, display advertising associated with a building or other structure, signs, maps or guides, menu displays in restaurants, vending machines, gaming machines, and the like. Back-lighted displays offer an attractive, eye-catching means of producing images that are readable from a large distance and in a wide variety of ambient light situations. Suitable substrates for supporting the image vary with the application. In some situations, it is desirable to utilize a flexible substrate, and in others, it is desirable to utilize a rigid substrate. In gaming machines such as pinball machines, slot machines, video poker machines, and the like, it is common to use a rigid substrate which is tough, such as annealed glass or a transparent plastic sheet material such as Lexan®. The substrate having an image thereon is mounted in an opening of a light box enclosure so that a source of light inside the enclosure illuminates the light-transmissive portions of the image to create a bright image as the impinging light is reflected and transmitted through the ink or dye of the image.

In the application of back-lighted displays in gaming machines, it has become increasingly important to create an image that when back-lighted has both high color saturation in its light-transmissive areas and high opacity in its black areas with extended fade resistance in the midtones. Manufactures of gaming equipment have found it desirable to be able to locate various components of the gaming machines in the light box. If the components are between the light source and the display image, the shadow created by the component will be visible outside the machine unless it falls on a sufficiently opaque area of the display image. It is a shortcoming of prior art techniques that the black areas are typically not sufficiently opaque to hide the undesirable shadows of such components or the dot pattern is so large that the areas in the back show through. To gain even higher densities, multiple layers may be mounted together to get blacker blacks, more saturated colors for rear- or back-lighted applications, or masters for photoprinting. This is done by applying adhesive to the multiple printed layers and using a laminator to make them into a single sheet by lamination.

Electrostatic or ink jet printing has the capability of producing images on light-transmissive media that have greater opacity and color saturation than other commercially significant techniques. In the prior art, the substrate on which ink jet printing is to be performed is coated with gelatin. It has been found that the ink, and especially the ink used to create black areas, has a tendency to travel transversely, or disperse, in the gelatin coating. The result is that the sharpness of the image and the definition of the black areas are not as sharp as is desired.

It has been found that a novel surface coating in accordance with the present invention provides many advantages and enhanced characteristics over gelatin. The surface coating in accordance with the present invention consists of a mixture of polyvinyl acetate and polyvinyl alcohol. In composition, the mixture comprises at least 15% polyvinyl acetate and no more than 85% polyvinyl alcohol. Preferably, the mixture comprises about 40% polyvinyl acetate and about 60% polyvinyl alcohol. In the preferred embodiment, partially hydrolyzed (88%) polyvinyl alcohol (PVA) powder, available from DuPont under the trademark Elvanol® 70-31, is added to water, without stirring, at a rate of between about 5 volume % and about 10 volume %, and preferably between about 7 volume % and about 8 volume %, PVA powder to water. In the preferred embodiment, the ratio of 7.5 volume % PVA powder to water is used. The mixture is placed in a steamer with little or no stirring until the PVA has gone into solution. It is critical that no bubbles be formed. A defoaming agent can be added up to 1.0 volume %. To retard mold and mildew, approximately 0.5 volume % food grade biocide is added.

Other characteristics of the PVA film can be controlled by the admixture of other agents. For example, glossiness of the PVA coating can be increased by the addition of liquid silica to the desired amount. A suitable liquid silica is sold by DuPont under the trademark Ludox®. Unplasticized PVA is generally not sufficiently flexible to allow for flexing of a flexible sheet material after coating. Accordingly, 3.0 volume % or less plasticizer, such as Ethoquad® C/25 by Avark is added to the PVA solution. The reflectivity of the PVA coating can be increased by the addition of less than 0.25 volume % optical brighteners, such as Tinopol® SFP by Ciba Geigy. If a white coating is desired, for example, for use on white Mylar® as the flexible sheet material, titanium oxide may be added. The ultraviolet absorbtivity of the PVA coating can be increased by the addition of an ultraviolet protectant such as that sold by CIBA-GIEGY under the trademark Tinuvin®.

The PVA solution then is mixed with polyvinyl acetate. As mentioned, the mixture 10 comprises at least 15% polyvinyl acetate and no more than 85% polyvinyl alcohol, and preferably the mixture 10 comprises about 40% polyvinyl acetate and about 60% polyvinyl alcohol. After preparing the mixture 10, the mixture is applied, as shown in FIG. 1, as a surface coating 12 to a first side 14 of a substrate 16. Preferably, the substrate 16 is porous such as art paper or canvas. However, the substrate may be non-porous and light-transmissive, for example, Mylar®, acetate, or the like. The mixture 10 can be applied to the substrate 16 by a suitable roller applicator 18 at a thickness of between about 0.5 mm and about 1.5 mm. In the preferred embodiment, the thickness of the coating is 0.75 mm. Depending on the surface characteristics of the mixture 10, one, two, three or more layers of the mixture 10 may be applied.

Figure 2:
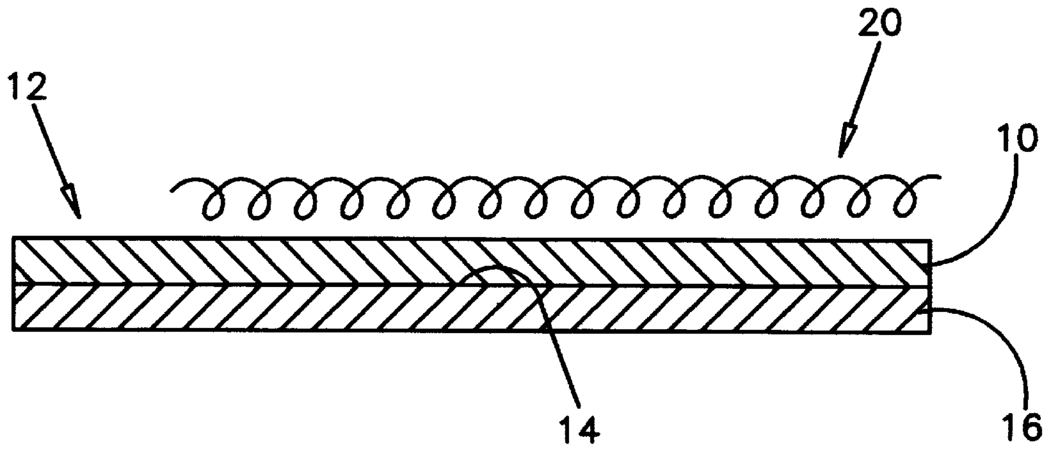
FIG. 2 is a side schematic representation of the substrate of FIG. 1 being heated with moving air.
Figure 3:
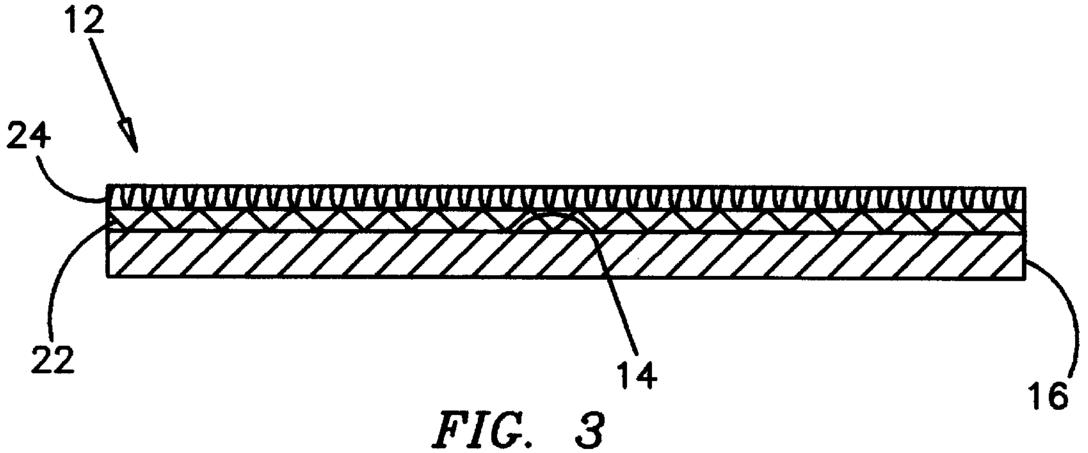
FIG. 3 is a side view of the substrate of FIG. 1 showing the surface coating separated into a hydrophobic layer and a hydrophilic layer.

After the mixture 10 has been applied to the first side 14 of the substrate 16, the mixture 10 is heated as shown in FIG. 2. The mixture 10 is first heated for between fifteen and twenty-five minutes with moving air 20 at a temperature of between about 60 and about 80 degrees Fahrenheit, and is preferably heated for about twenty minutes with moving air 20 at a temperature of about 75 degrees Fahrenheit. Then, the mixture 10 is heated for between about three and about eight minutes with moving air 20 at a temperature of between about 100 and about 140 degrees Fahrenheit, and is preferably heated for about five minutes with moving air 20 at a temperature of about 120 degrees Fahrenheit. During heating, the polyvinyl alcohol in the mixture 10 at least partially cures by evaporation and the polyvinyl acetate migrates to the top and "skins up." In this manner, the surface coating 12, as shown in FIG. 3, separates into a bottom, hydrophilic layer 22 of polyvinyl alcohol and a top, hydrophobic layer 24 of polyvinyl acetate.

Figure 4:
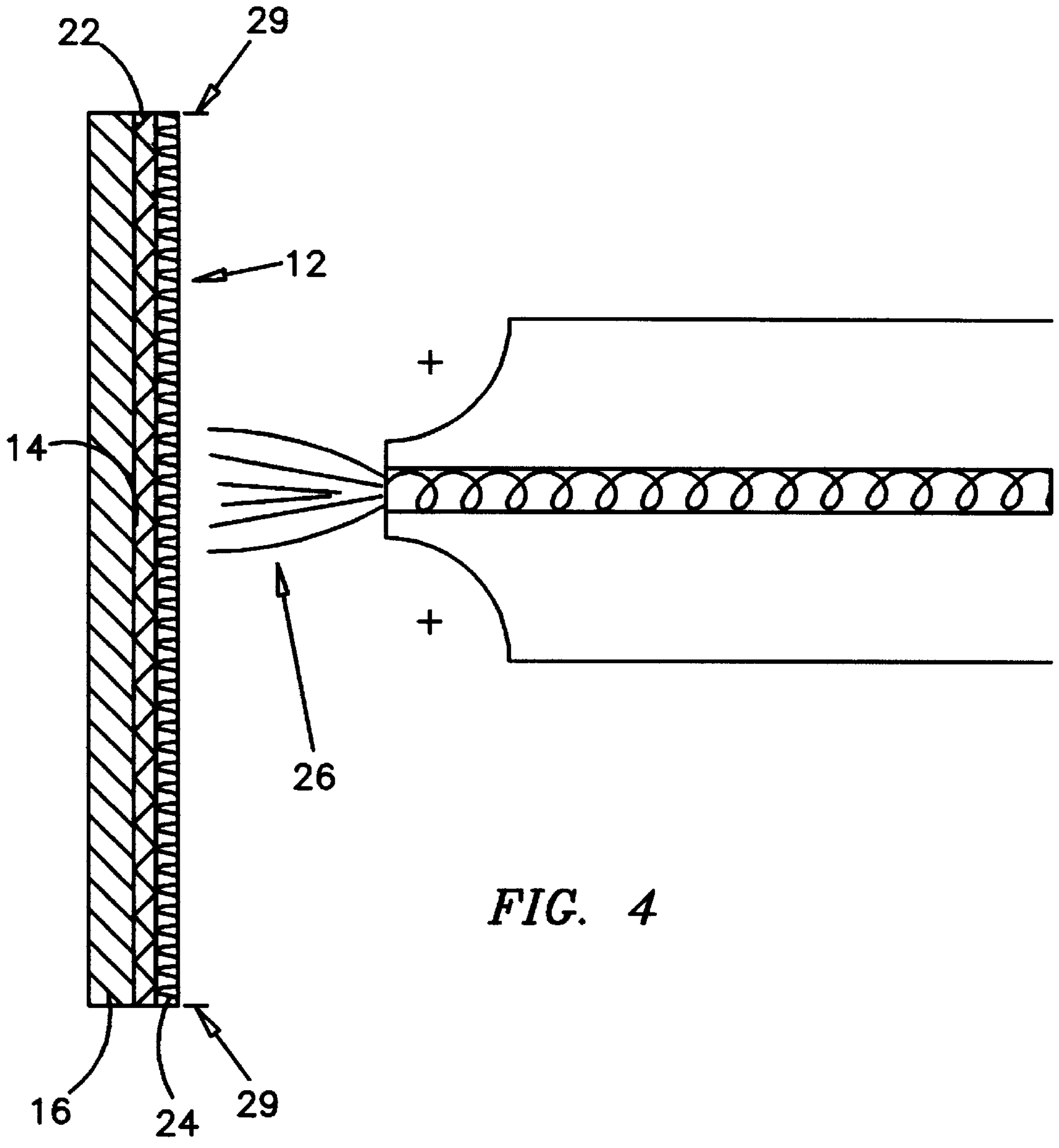
FIG. 4 is a side schematic representation of the substrate of FIG. 3 showing a surface charge being applied to the first side of the substrate while the first side of the substrate is being printed thereon.

After the surface coating 12 separates into a hydrophilic layer 22 and a hydrophobic layer 24, an image is printed on the substrate 16. Preferably, a water-soluble ink 26 is deposited onto the surface coating to produce the image, and is deposited by a computer-controlled ink jet machine such as is sold by the Scitex Corporation under the trademark IRIS®, the ENCAD printer under the trademark Nova Jet®, or printers manufactured that use the Hewlett Packard ink delivery system. Other direct-digital non-ink systems are electrostatic systems from Versatec, Rastorgraphics, 3M, or direct-digital presses, like Indigo and Heidelberg. As the ink is deposited, the hydrophobic layer 24 generally repels the ink 26, and the hydrophilic layer 22 generally absorbs the ink 26. If ink jet printing is, in fact, used, as shown in FIG. 4, typically a surface charge 29 is applied to the top surface of the substrate 16 by a brush in advance of the ink 26 is being deposited onto the substrate 16. Using a conventional gelatin-coated Mylar® sheet, it has been found that a relative negative charge in excess of about 4,000 volts negative will result in degradation of the quality of the image being formed. Using a coated paper of the present invention, a preferred relative negative voltage range is between about 400 and about 2200 volts. However, the surface coating 12 in accordance with the present invention can maintain an enhanced surface charge density at voltages of between about 10,000 volts and about 14,000 volts negative without degrading the quality of the image being formed. Additionally, the surface charge 29 can be applied, without use of brushes, to the same side on which the image is printed, namely the first side 14 of the substrate 16, assuming that the surface coating 12 is not too thick. If the surface coating 12 is thick, the surface charge 29 can be applied to the opposite side of the substrate 12, as does Canon. Regardless, a higher negative charge 29 causes more of the ink 26 to be deposited at the desired location on the substrate 16; therefore, sharper images can be printed. Additionally, the enhanced surface charge 29 causes the ink 26 to travel more quickly to the substrate 16; therefore, the image can be more quickly printed thereon. In actual use, it has been found, depending on the environmental temperature and humidity, that lowering the drum speed of the ink jet printer will result generally in a higher charge density forming on the top of the paper. At the desired printing speed and relative voltage between the drum and the ink jet head, if misting of ink is observed above the paper (due to back-scattering of the high-velocity ink droplets after impact with the paper), the humidity is decreased or increased, the temperature is increased or decreased or the drum speed is slowed, or a combination of the foregoing, until the misting effect is reduced to satisfactory levels.

Figure 5:
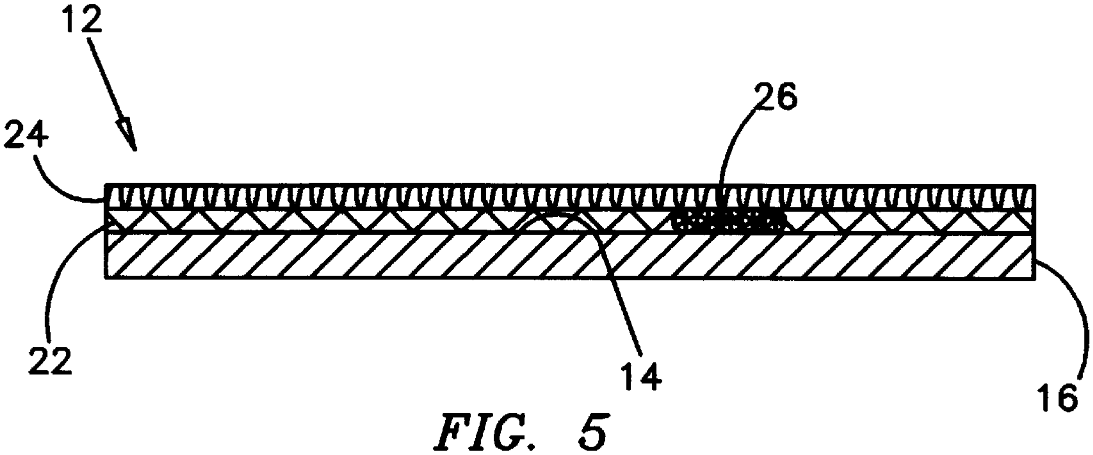
FIG. 5 is a side view of the substrate of FIG. 3 showing ink absorbed into the hydrophilic layer.

After the ink 26 is absorbed into the hydrophilic layer 22 as shown in FIG. 5, the hydrophobic layer 24 can protect the absorbed ink 26 from fading due to exposure to UV light. In fact, it has been found that, in some circumstances, as has been verified using a fadiometer at ILFORD Photo, the hydrophobic layer 24 can improve an ink's resistance to, and longevity against, fading by up to 700%.

Figure 6A:
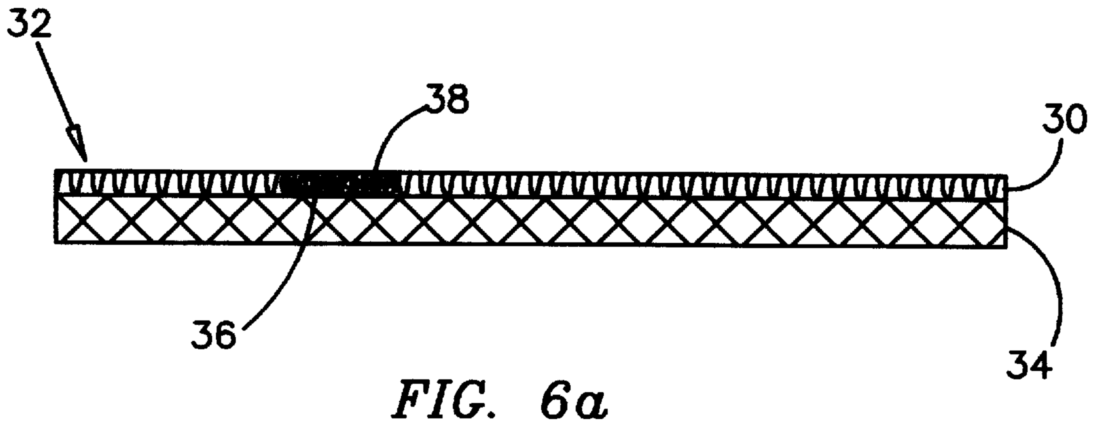
FIG. 6*a* is a top schematic view of a substrate having a hydrophilic surface coating thereon showing a first color of ink repelling a second color of ink in the hydrophilic layer.
Figure 6B:
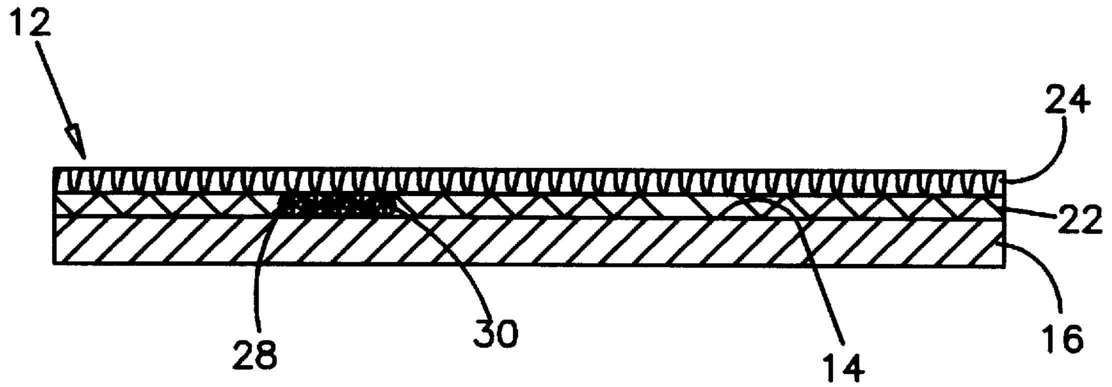
FIG. 6*b* is a top schematic view of the substrate of FIG. 3 showing an ink of a second color being repelled less from a first color of ink in the surface coating.

Additionally, the hydrophobic layer 24 causes the ink 26 to spread less in the transverse direction within the hydrophilic layer 22. Therefore, there results less color bleeding and a shaper image having finer resolution, compared to when only a hydrophilic layer 22 is utilized as the surface coating 12 of the substrate. As shown in FIG. 6*b*, if more than one color of ink is deposited into the surface coating, the hydrophobic layer 22 causes a second color ink 28 to be repelled less from a first color of ink 30 in the surface coating 12 compared to when, as shown in FIG. 6*a*, solely a hydrophilic layer 30 is utilized as a surface coating 32 on a substrate 34 in which case a first color ink 36 may sharply repel a second color ink 38 causing the second color ink 38 to surround the first color ink 36. This is known as "repellancy", and results because certain colors of ink, such as yellow, naturally repel other certain colors of ink, such as magenta and results in a halo effect wherein the second color of ink, which is intended to be placed directly over top of the first color of ink is instead repelled and ends up primarily in a halo around the first color of ink. Fortunately, "repellancy" can be reduced by utilizing a surface coating 12 in accordance with the present invention.

Figure 7:
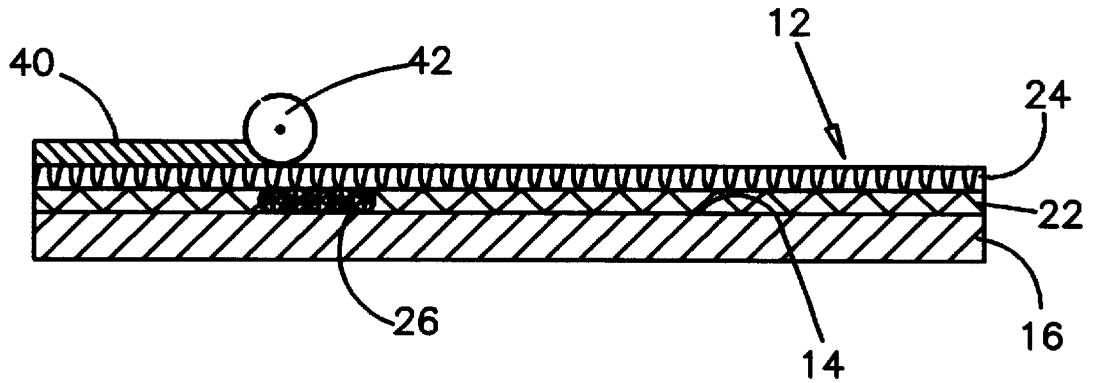
FIG. 7 is a side view of the substrate of FIG. 5 showing a water-based coating substance being coated thereon.

As shown in FIG. 7, the presence of the hydrophobic layer 24 allows a water-based coating 40 to be applied to the substrate 16 after printing. The water-based coating 40 can be applied by a suitable roller applicator 42, myre rod, or by aeresol spraying. Overcoating the substrate 16 after printing can protect the ink 26 from UV light and moisture, improve the "black density" of the colors of the image, decrease retraction, and may even increase reflectivity. In order to be able to effectively use a water-based coating 40, it is necessary to carefully meter the proportion of polyvinyl acetate to polyvinyl acetate. If there is not enough polyvinyl acetate in the surface coating 12, it is not possible to use a water-based coating 40. However, it has been found that a water-based coating 40 can be used when the surface coating 12 is a mixture 10 comprising about 50% polyvinyl alcohol and about 50% polyvinyl acetate. It is important to be able to use a water-based coating since using a water-based coating is a much more environmentally friendly alternative to using mineral, spirits-based, or solvent-based coatings, such as those distributed by ILFORD Photo, Paramus, New Jersey under the trademark ILFOJET GALARIE FA. Appropriate water-based coatings are sold by, for example, Gemini Coatings, Inc. of El Reno, Okla.

Although the invention has been described with respect to a preferred embodiment thereof, it is to be also understood that it is not to be so limited since changes and modifications can be made therein which are within the full intended scope of this invention as defined by the appended claims.

What is claimed is:

1. A surface coating on a first side of a substrate, said surface coating comprising a hydrophobic layer comprised of polyvinyl acetate and a hydrophilic layer comprised of polyvinyl alcohol, said hydrophilic layer being between said hydrophobic layer and said first side of said substrate.

2. The surface coating according to claim 1, wherein said surface coating comprises a mixture applied on said first side of said substrate, wherein said mixture comprises at least 15% polyvinyl acetate, and no more than 85% polyvinyl alcohol.

3. The surface coating according to claim 1, wherein said mixture comprises about 40% polyvinyl acetate and about 60% polyvinyl alcohol.

4. The surface coating according to claim 2, wherein said mixture has been heated for a period of time after having been applied on said first side of said substrate.

5. The surface coating according to claim 4, wherein said period of time is between about ten and about forty minutes.

6. The surface coating according to claim 5, wherein said surface coating has been heated for between about fifteen and about twenty minutes with moving air at a temperature between about 60 and about 80 degrees Fahrenheit, and then has been heated for between three minutes and about eight minutes with moving air at a temperature of between about 100 and about 140 degrees Fahrenheit.

7. The surface coating according to claim 2, wherein said mixture separates into said hydrophilic layer and said hydrophobic layer, and wherein said separation causes said hydrophilic layer to be between said hydrophobic layer and said substrate.

8. The surface coating according to claim 1, wherein said surface coating is coatable with a water-based coating substance.

9. The surface coating according to claim 1, wherein said polyvinyl alcohol has cured by evaporation.

10. The surface coating according to claim 1, wherein said substrate is porous.

11. The surface coating according to claim 1, further comprising a water-soluble ink deposited into said surface coating, wherein said ink is generally repelled by said hydrophobic layer, and wherein said ink is generally absorbed by said hydrophilic layer.

12. The surface coating according to claim 11, wherein said hydrophobic layer protects from fading said ink absorbed into said hydrophilic layer.

13. The surface coating according to claim 1, wherein said surface coating can maintain a surface charge density of between about 450 volts and about 2200 volts to prevent misting.

14. The surface coating according to claim 11, wherein said hydrophobic layer causes said ink to spread less in said hydrophilic layer.

15. The surface coating according to claim 11, wherein more than one color of ink is deposited into said surface coating and wherein said hydrophobic layer causes a second color ink to be repelled less from a first color of ink in said surface coating.

16. The surface coating according to claim 8, wherein said surface coating comprises a mixture on said first side of said substrate, wherein said mixture comprises about 50% polyvinyl acetate, and about 50% polyvinyl alcohol.

17. The surface coating according to claim 13, wherein said hydrophobic layer allows a charge to be applied to said first side of said substrate as said substrate is being printed thereon.

18. The surface coating according to claim 1 wherein said substrate comprises fine art paper.

19. The surface coating according to claim 1 wherein said substrate comprises canvas.

20. A method of providing a surface coated substrate for printing an image thereon, said method comprising:

a) providing a mixture comprising at least 15% polyvinyl acetate and at most 85% polyvinyl alcohol;

b) providing a substrate having a first side; and c) applying said mixture on said first side of said substrate, wherein said mixture separates into a hydrophilic layer and a hydrophobic layer after said mixture is applied onto said first side of said substrate, said hydrophilic layer being between said hydrophobic layer and said first side of said substrate.

21. The method according to claim 20, wherein said hydrophilic layer comprises polyvinyl alcohol, and wherein said hydrophobic layer comprises polyvinyl acetate.

22. The method according to claim 19, wherein said mixture comprises about 40% polyvinyl acetate and about 60% polyvinyl alcohol.

23. The method according to claim 19, further comprising heating for a period of time said mixture after applying said mixture onto said first side of said substrate.

24. The method according to claim 23, wherein said period of time is between about ten and about forty minutes.

25. The method according to claim 23, wherein said mixture is heated for between about fifteen and about twenty-five minutes with moving air at a temperature of between about 60 and about 80 degrees Fahrenheit, and then is heated for between about three and about eight minutes with moving air at a temperature of between about 100 and about 140 degrees Fahrenheit.

26. The method according to claim 19, wherein said mixture separates into a hydrophilic layer and a hydrophobic layer, wherein said hydrophilic layer is between said hydrophobic layer and said substrate.

27. The method according to claim 19, further comprising coating said mixture with a water-based coating substance after applying said mixture onto said first side of said substrate.

28. The method according to claim 21, wherein said polyvinyl alcohol cures by evaporation.

29. The method according to claim 19, wherein said substrate is porous.

30. The method according to claim 20, further comprising depositing a water-soluble ink into said surface coating, wherein said ink is generally repelled by said hydrophobic layer, and wherein said ink is generally absorbed by said hydrophilic layer.

31. The method according to claim 30, wherein said hydrophobic layer protects from fading said ink absorbed into said hydrophilic layer.

32. The method according to claim 20, wherein said surface coating can maintain a surface charge density of between about 450 volts and about 2200 volts.

33. The method according to claim 30, wherein said hydrophobic layer causes said ink to spread less in said hydrophilic layer.

34. The method according to claim 30, wherein more than one color of ink is deposited into said surface coating and wherein said hydrophobic layer causes ink of a second color to be repelled less from a first color of ink in said surface coating.

35. The method according to claim 27, wherein said mixture comprises about 50% polyvinyl acetate, and about 50% polyvinyl alcohol.

36. The method according to claim 20, wherein said hydrophobic layer allows a charge to be applied to said first side of said substrate as said substrate is being printed thereon.

37. The method according to claim 20 wherein said substrate comprises fine art paper.

38. The method according to claim 20 wherein said substrate comprises canvas.

* * * * *